(12) United States Patent
Benachenhou (10) Patent No.: US 7,635,435 B2
(45) Date of Patent: Dec. 22, 2009

(54) METHOD AND APPARATUS FOR OIL WATER SEPARATION

(75) Inventor: Amine Benachenhou, Montréal (CA)

(73) Assignee: Separatech Canada Inc., Montréal, QC (CA)

( * ) Notice: Subject to any disclaimer, the term of this patent is extended or adjusted under 35 U.S.C. 154(b) by 0 days.

(21) Appl. No.: 10/551,520

(22) PCT Filed: Apr. 1, 2003

(86) PCT No.: PCT/CA03/00468

§ 371 (c)(1),
(2), (4) Date: Jun. 8, 2006

(87) PCT Pub. No.: WO2004/087286

PCT Pub. Date: Oct. 14, 2004

(65) Prior Publication Data

US 2006/0231510 A1 Oct. 19, 2006

(51) Int. Cl.
*B01D 17/022* (2006.01)
*B01D 17/04* (2006.01)
(52) U.S. Cl. .............. 210/741; 210/791; 210/799; 210/108; 210/252; 210/335; 210/333.01; 210/DIG. 5
(58) Field of Classification Search .......... None
See application file for complete search history.

(56) References Cited

U.S. PATENT DOCUMENTS

| | | | |
|---|---|---|---|
| 3,558,482 A | 1/1971 | De Young | |
| 3,847,821 A | 11/1974 | Krueger | |
| 4,059,511 A * | 11/1977 | Musha et al. | 210/708 |
| 4,145,280 A * | 3/1979 | Middelbeek et al. | 210/665 |
| 4,220,544 A | 9/1980 | McGrew | |
| 4,497,707 A | 2/1985 | Anderson | |
| 4,591,441 A | 5/1986 | Sakai | |
| 5,229,015 A * | 7/1993 | Keep et al. | 210/799 |
| 5,239,040 A * | 8/1993 | Kozlowski | 528/49 |

(Continued)

FOREIGN PATENT DOCUMENTS

GB 1 418 806 12/1975

(Continued)

OTHER PUBLICATIONS

COP-System FAQ List; publication date unknown; downloaded from www.Separatech.com on Sep. 18, 2008; 15 pages.*

(Continued)

*Primary Examiner*—Robert James Popovics
(74) *Attorney, Agent, or Firm*—Ogilvy Renault LLP (57) ABSTRACT

A method and apparatus for separating immiscible liquids in a dispersion containing an aqueous liquid and at least one dispersed non-aqueous liquid by passing the dispersion through a series of absorbents, preferably polymeric. The direction of the flow through the absorbent is periodically changed. The period required before a change of the flow direction is established by the differential pressure. There is a gradual increase in the differential pressure across the absorbents which indicates a blockage due to viscous oil and/or solids. The product produced by the method and the apparatus of the invention is a polished non-aqueous phase and a polished aqueous phase both having low contaminant levels. In a preferred embodiment when solids are also present in the dispersion, a solids stream is also recovered.

38 Claims, 3 Drawing Sheets

U.S. PATENT DOCUMENTS

| | | | | |
|---|---|---|---|---|
| 5,331,079 | A | * | 7/1994 | Kozlowski .................... 528/48 |
| 6,015,502 | A | | 1/2000 | Dzhragatspanvan et al. |
| 7,297,279 | B2 | * | 11/2007 | Johnson et al. ............. 210/669 |
| 7,416,667 | B2 | * | 8/2008 | Benachenou et al. ........ 210/285 |
| 2004/0112823 | A1 | * | 6/2004 | Benachenou et al. ........ 210/285 |
| 2005/0035037 | A1 | * | 2/2005 | Lindsey et al. .............. 210/109 |
| 2006/0231510 | A1 | * | 10/2006 | Benachenhou .............. 210/799 |
| 2007/0251876 | A1 | * | 11/2007 | Krogue et al. ........... 210/323.2 |
| 2008/0041796 | A1 | * | 2/2008 | Ruprecht .................... 210/799 |
| 2008/0105619 | A1 | * | 5/2008 | Benachenou et al. ........ 210/665 |
| 2008/0237152 | A1 | * | 10/2008 | Benachenhou .............. 210/799 |
| 2009/0039021 | A1 | * | 2/2009 | Benachenou et al. ........ 210/643 |

FOREIGN PATENT DOCUMENTS

| | | |
|---|---|---|
| GB | 2 083 370 | 3/1982 |
| WO | WO 02/20115 | 3/2002 |
| WO | WO 2004087286 A1 * | 10/2004 |

OTHER PUBLICATIONS

Further Advances in Produced Water De-Oiling Utilizing a Technology That Removes and Recovers Dispersed Oil in Produced Water 2 Microns and Larger; M.J. Plebon, Marc Saad, Serge Fraser; Earth (Canada) Corporation; Montreal, Quebec Canada, 20 pages; Publication Date Unknown.*

* cited by examiner

METHOD AND APPARATUS FOR OIL WATER SEPARATION

This application is a National Phase entry of, and claims priority on International Patent Application No. PCT/CA2003/000468, the entire contents of which is herein incorporated by reference.

BACKGROUND OF THE INVENTION

1. Field of the Invention

This invention relates to a method and apparatus for separation of two immiscible liquids, one aqueous and the other non-aqueous, such as water and oil, where one liquid is highly emulsified in the other.

2. Description of Prior Art

Oily water is generated at many points during oil production, for example, at the wellhead, several barrels of oily water are generated for every barrel of oil produced. This oily water, also called produced water, must be treated to obtain acceptable levels of oil-in-water before re-injection into the well or disposal, i.e. into the ocean. Ballast and bilge waters also represents a big challenge because of the strict regulations with respect to disposing of such effluents. In the Great Lakes in North America, the bilge water must attain levels below 5 mg/l of total oil & grease before disposal. Oil spills and contaminated groundwater can generate high volumes of oily water which must be treated before disposal. Furthermore, most industries generate varying amounts of oily water, the quantity of which depends on their production rate and process. This industrially produced oily water must be treated to reduce the fouling of instruments and equipment, to minimize interference with other processes and to reduce oil accumulation in unwanted areas thereby minimizing hazards.

The treatment of oily water can be achieved by several well-known and accepted techniques. However, each technique has limitations which depend on the characteristics of the oily water to be treated. Most of the processes of the prior art use Stoke's Law as a basis for design.

Stoke's Law explains that the rising velocity of an emulsion particle (such as oil) in a continuous phase (water) is proportional to the square of the diameter of the emulsion particle. Therefore, by doubling the diameter of a given emulsion particle, the particle's rising velocity is multiplied by four, and thus, the time required for the droplet to rise to a collection surface is also reduced. As the emulsion particles get smaller, a random molecular motion called Brownian movement, tends to keep the emulsion particles in suspension. Through random molecular collisions of the surrounding aqueous phase with the finely dispersed emulsion particles, the effect of gravity on the emulsion particles tends to be suppressed, so that settling is slowed or completely halted.

One of the most widely used systems to treat oily water is an oil/water separator, such as the API (American Petroleum Institute) separator, which can remove free-floating oil but cannot separate fine emulsions (particles less than 150 μm in diameter). Other well-known and widely used systems are corrugated plates interceptors and parallel plates interceptors, which are limited to oil emulsions where particle sizes are 30 μm or larger. The removal of oil emulsions where the diameter of the particles is less than 20 μm is very difficult, because in many cases they make up a high proportion of the total oil content, and it is impossible to reduce the level in the discharge to the permissible levels with conventional equipment. To enhance the rising velocity of such emulsions, other techniques are used, like coagulation/flocculation followed by a gravity separation system. In this process, chemicals are used to destabilize and coalesce the emulsions in order to make them larger, and easier to separate from the water. Coagulation/flocculation processes produce an oil contaminated with expensive chemicals.

Filtration-like separation processes are another category of oil removal processes, that are effective in removing very fine emulsions (diameter of 2 μm or more) as described by Benachenhou in WO/02/20115. Several media materials are used alone or together The most commonly used media are polymeric materials, however sand, anthracite, and clay have also been used as separation media. When sand, anthracite and clay are used they are produced with a particular form or shape. These filtration technologies are also limited, because of their sensitivity to the presence of viscous oils and/or suspended solids. It is not unusual that the materials used as a separation media become clogged with highly viscous oils or with suspended solids within 24 hours of operation, thus requiring replacement of the filtration media or backwashing with fresh or treated water, which results in even more oily wastes or more contaminated backwash liquids.

Additional patents of some background interest are the following: U.S. Pat. No. 3,738,492; U.S. Pat. No. 4,022,694; U.S. Pat. No. 4,213,863; U.S. Pat. No. 6,015,502; GB. 1,418,806; GB 1,517,715

SUMMARY OF THE INVENTION

It is an object of this invention to provide a method and apparatus for separating an immiscible liquid in a dispersion containing an aqueous liquid and at least one dispersed non-aqueous liquid.

It is a particular object of the invention to provide a coalescing media which separates immiscible liquids in dispersion.

In accordance with one embodiment of the invention there is provided a method of separating immiscible liquids in a dispersion comprising an aqueous liquid and at least one non-aqueous liquid immiscible in the aqueous liquid and wherein the non-aqueous liquid is dispersed in the aqueous liquid, comprising: a) feeding the dispersion from a feed supply to a chamber housing a plurality of coalescing zones, in a first direction through the, zones from an initial upstream zone to a final downstream zone; b) partially coalescing the dispersed non-aqueous liquid in said coalescing zones; c) recovering a partially coalesced emulsion of said liquids, downstream of said final downstream zone, and d) periodically discontinuing the feeding in said first direction and feeding said emulsion in a second direction, counter to said first direction, such that said final downstream zone of a) becomes a second direction initial upstream zone and said initial upstream zone of a) becomes a second direction final downstream zone.

In another embodiment of the invention there is provided an apparatus for separating immiscible liquids in a dispersion comprising an aqueous liquid and at least one non-aqueous liquid immiscible in the aqueous liquid and wherein the non-aqueous liquid is dispersed in the aqueous liquid, comprising: a primary vessel including; an inlet means through which the dispersion enters the vessel and producing a flow within the vessel in a first direction; an outlet means through which a partially coalesced emulsion leaves the vessel; a plurality of coalescing compartments which contain a coalescing media on which the dispersed non-aqueous liquid partially coalesces to produce the partially coalesced emulsion; the compartments including a first direction upstream compartment and a first direction last downstream: compartment; a flow direction changing means acting on the inlet means and the outlet means for periodically changing the flow within the vessel to a second direction counter to the first direction, such that said first direction Upstream compartment becomes a second direction last downstream compartment and said first direction last downstream compartment becomes a second direction upstream compartment.

In a particular embodiment of the invention there is provided in an apparatus for separating immiscible liquids in a dispersion comprising an aqueous liquid and at least one non-aqueous liquid immiscible in the aqueous liquid and wherein the non-aqueous liquid is dispersed in the aqueous liquid and a polymeric coalescing media is used for separating the liquids in the dispersion by passing the dispersion through the coalescing media, the improvement wherein the coalescing media includes a substantially homogeneous porous mass, the porous mass including a network of fine filaments and substantially uniform sized open cells in the filaments, wherein the coalescing media can separate non-aqueous emulsions from the aqueous phase having a droplet diameter of at least 0.5 µm.

DESCRIPTION OF PREFERRED EMBODIMENTS

This invention seeks to overcome the difficulties described above and provides a method and apparatus which will separate oil in water emulsions which may contain viscous oils; or solids, and have emulsion particle size diameters as small as 0.5 µm, quickly with a separation performance relatively unaffected by the level of solids, and which will provide the non-aqueous phase in a recoverable form.

The coalescing media may, in particular, be an absorbent or adsorbent material. Absorbent or adsorbent materials which have relatively low absorption or adsorbent ability or capacity, such that coalesced droplets are readily released from the material are especially advantageous in the invention.

The mass of the dispersion is allowed to flow directly through the absorbent material, with the bulk of the dispersion flowing through an extensive network of passages between the filaments and through the pores in the filaments. The absorbent preferably has a limited capacity that traps the dispersed oil droplets due to its affinity for them but also allows coalesced droplets to be released. Due to this valuable property, the absorbent is also an effective coalescing media. When the oily dispersion of fine droplets is passed through this coalescing media, some of the oil droplets will be trapped within the pores of the absorbent due to their attraction for the absorbent. Here the non-aqueous droplets will be held until others find their way into the pores, and as more enter they will eventually produce droplets that are sufficiently close to one another to coalesce. This process will continue until the pores are relatively full and the larger droplets will be forced out by the flow of the liquid and their willingness to start rising. The relatively uniform nature of the absorbent pores makes for the release of a substantially uniform size droplet.

Throughout the specification the terms oil, fuel and hydrocarbon are defined as a class of liquids which are not very soluble in water, and thus are essentially immiscible. Furthermore, the term non-aqueous is used to describe a liquid which is not water.

In one embodiment, the coalescing media of the invention has a high surface area, a substantially homogeneous porous mass, which is normally a polymeric matrix such as polyester, polystyrene, polypropylene and polyethylene, most preferably polyurethane, which has the ability to absorb/adsorb fine oil emulsions within or on its relatively uniform and fibrous network structure. The physical separation phenomenon on the polymeric matrix that produces the coalescence of the oil droplets and the separation of the aqueous and non-aqueous phases on the polymer, is a complex phenomenon and is likely to be a combination of absorption and adsorption followed by the coalescence of the small non-aqueous phase droplets, into larger droplets.

Throughout the disclosure the following terms are defined as synonyms:
1) absorption=adsorption; 2) absorbent=sorbent=coalescing media(nouns);
3) absorbent=adsorbent(adjectives), and 4) absorb=adsorb (verbs).

Emulsions with droplets as small as 0.5 µm are separated by the method and in the apparatus of the invention. The emulsions coalesce within the network structure of the absorbent into larger droplets and are then released in a recoverable form, producing:
 a polished aqueous phase containing an acceptable level of a non-aqueous phase, and
 a polished non-aqueous phase containing an acceptable level of the aqueous-phase.

DESCRIPTION WITH REFERENCE TO DRAWINGS

Polyurethanes are polymers which contain urethane groups. They are synthesized from a polyol and a diisocyanate, following the general scheme:

$$HO-R_1-OH + OCN-R_2-CNO \rightarrow OCN-R_2-[-NH-COO-R_1-OOC-NH-R_2-]_n-NCO$$

Polyol diisocyanate polyurethane in which $R_1$ and $R_2$ may be selected from a wide variety of aliphatic and aromatic radicals, as is well known in the polyurethane art.

Figure 3:
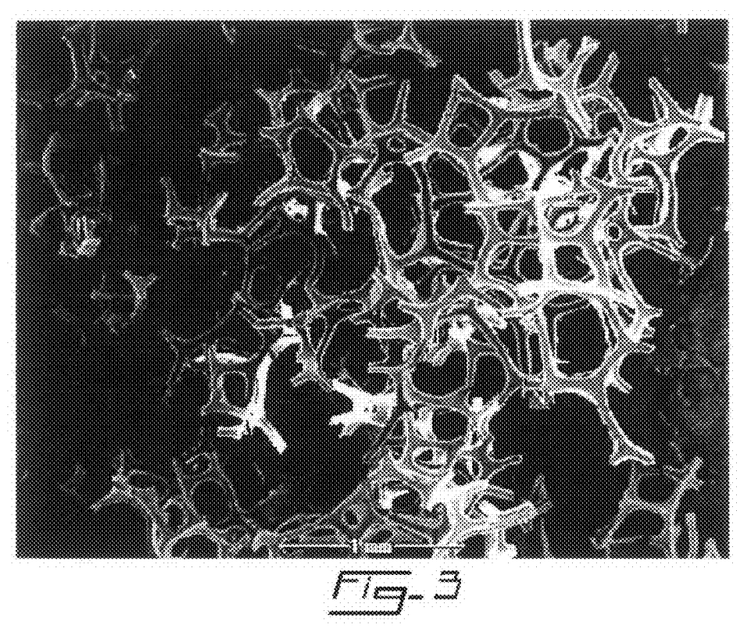
FIG. 3 is a scanning electron micrograph (x30) showing the structure of the polyurethane polymeric absorbent of the invention, and, FIG. 4 is the scanning electron micrograph x30) of the polyurethane polymeric absorbent of Application WO/02/20115.
Figure 4:
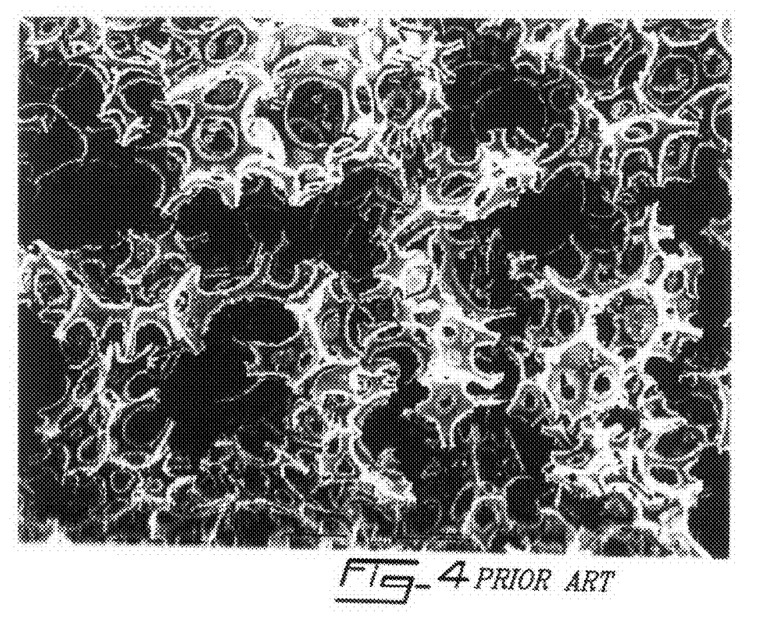

Because of a variety of diisocyanates and a wide range of polyols that can be used to produce polyurethane, a broad spectrum of materials can be produced to meet the needs of specific applications. FIGS. 3 and 4, are Scanning Electron Microscopy (SEM) micrographs of two polyurethanes: A preferred absorbent material or coalescing media of the invention, is reusable oil de-emulsifier sorbent (RODS); and an absorbent material used in the process described in WO/02/20115, or recovered petroleum absorbent (RPA).

As with other polymers (polyester, polypropylene, etc.), polyurethaned materials are known to absorb and/or adsorb chemical compounds. Most oils, and fuels such as gasoline, are successfully absorbed by industrial absorbents which include polyurethanes.

The affinity of polyurethanes for the targeted chemical compound depends on the properties of the material, which include their chemical structure and that of their functional groups. Their absorption capability is due to the presence of ester (or ether) groups —COO— that are lipohilic, that is, have an affinity for oleophilic compounds such as petroleum hydrocarbons. Ester groups in the backbone of the polymer are also known to be highly hydrophobic. For these reasons polyurethanes are very useful materials for absorption when used as an oil/water separation media.

This absorption/adsorption by the polyurethane involves the accumulation of the targeted chemical compound at the interface or within the coalescing media. The accumulation of oil per unit area is small, thus highly porous materials with a very large internal surface area per unit volume preferred. The surfaces are usually irregular (as seen in FIG. 4), and the bonding energies (primarily from Van Der Waals forces) vary widely from one site to another. However, the adsorption/absorption surfaces and pores are provided by channels or cavities within a macro crystal structure; the cavities exhibit high uniformity of adsorbent surface (as shown in FIG. 3) with practically constant binding energy.

The following data, seen in FIGS. 3 and 4, was obtained by Scanning Electron Microscopy (SEM) micrographs; the cell wall thickness of the preferred polyurethane of the invention typically is from 40 to 55 µm (FIG. 3), as compared to a thickness between 60 and 80 µm (FIG. 4). The cell openings of the preferred polyurethane of the invention are quite regular in size while the cell openings of the polyurethane of FIG. 4, vary substantially.

The coalescing media, which is also called rods, is a reticulated fully open pore, flexible ester or ether type polyurethane foam. Unlike ordinary urethane foams, it is characterized by a totally open three-dimensional skeletal structure of strands which in an uncompressed form, provides up to 98% void space and a very high degree of permeability, which gives it special coalescing and filtering properties. The rods tend to have a preferred physical size between 1.5 and 2.0 but larger (5-10 mm) and smaller rods (approximately 1 mm) have been used successfully.

Some of the physical properties of the coalescing media of the invention include a totally open skeletal structure which is both flexile and resilient, a high surface area (2300 $ft^2/ft^3$) along with high void volume and a controlled pore size of 100 pores per linear inch (100 ppi) with a range from 65 to 125 ppi, and a particularly preferred range of 80 to 100 ppi.

The homogeneous structure of the coalescing media helps minimize the possibility of open channels which could drastically affect separation efficiency. Each cell in the media is completely interconnected with all surrounding cells. This allow for free passage of liquids (and thus low pressure drops) and at the same time provides high surface-area contact for coalescing emulsion particles. The resilience and strength of the foam helps prevent strand displacement under normal operating conditions. The structure of the coalescing media has an absorption or adsorbent character effective to trap dispersed non-aqueous droplets for coalescence, and readily release coalesced droplets of the non-aqueous liquid.

The principal physical property differences between the preferred absorbent of the invention and that of the prior art (WO 02/20115), are the percentage void space and the homogeneity of the porous mass. The preferred absorbent has at least one of the properties listed in Table 1 and preferably a plurality of properties listed in Table 1.

Table 1 presents a comparison of the properties of the preferred absorbent of the invention and the sorbent of WO 02/20115.

TABLE 1

| Physical Property | unit | Test Method | Sorbent of the Invention (preferred range in brackets) | Prior Art Sorbent WO 02/20115 |
|---|---|---|---|---|
| pores/linear inch (ppi) | | ASTM D3574 | 65 to 120 (80 to 100) | Irregular pore sizes |
| Compressed density | lbs/ft³ | ASTM D3574 | 2.5 to 19 | 8 |
| Non-Compressed density | lbs/ft³ | ASTM C29/C29M | Avg. 1.9 (1.5-2.5) | 1.9 |
| tensile strength | kPa | ISO 1798 | 240 (100-240) | 415 |
| tear strength | N/mm | ISO 8067 | 0.7 | 3.5 |
| Elongation at Break | % | ISO 1798 | 415% (190%-500%) | 50% |
| Cell wall thickness | µm | Scanning Electron Microscopy (SEM) | (40-55) | 60-80 |
| Cell Diameter | µm | Scanning Electron Microscopy (SEM) | (160-220) | Irregular |
| Particle size of the bulk sorbent | mm | | 0.5-10 (1.5-2.0) | 2.0-10 |
| Void Space | % | ASTM C1252 | typical 97% (80% to 98%) | 30% |
| Void space (after compression to 900 ppi) | % | ASTM C1252 | typical 70% (60% to 80%) | 20% |

The physical property information helps to explain the greater selectivity for smaller oil dispersion particles and their greater resolution and retention on the preferred polyurethane of this invention, which is able to retain 0.5 µm diameter emulsions or more, while the smallest size of oil dispersions separated with materials of the prior art, varies from 1.5 to 2 µm in diameter.

The coalescing media can also be compressed between 600 to 1000 pores per inch, by compressing the standard media (65-120 ppi) through a compression ratio of as much as 10. By varying the compression conditions, the ratio of initial foam thickness (initial ppi) to final thickness, the coalescing media can be given specific design properties. The compression ratio exerted on the coalescing media can be optimized for the separation of particular oils having different densities, viscosities and dispersion particle sizes.

SUMMARY OF PREFERRED EMBODIMENTS

Figure 1:
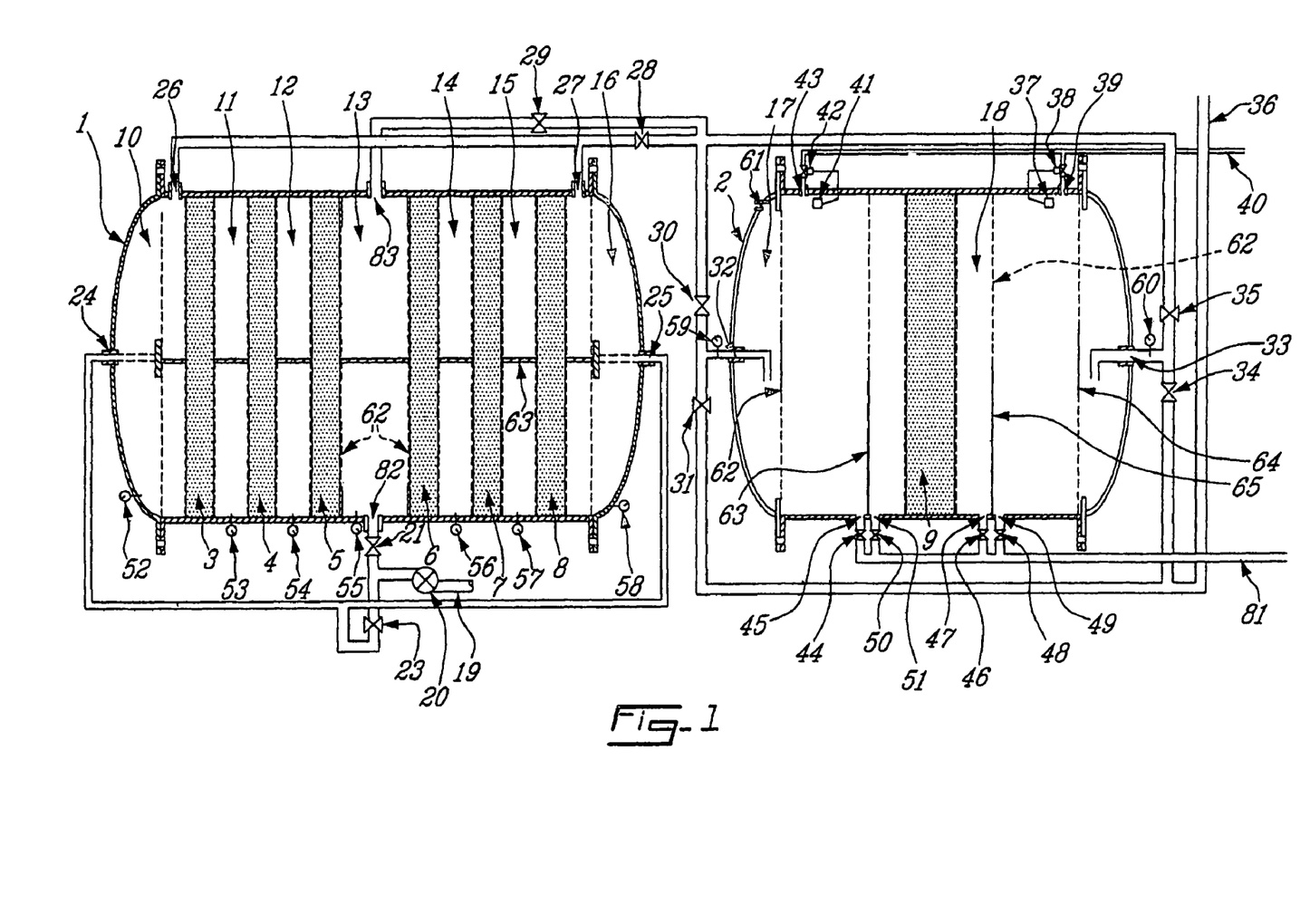
FIG. 1 is a schematic representation of the apparatus of the invention with a plurality of vertical absorbent compartments, and the primary and polishing vessels having a horizontal aspect.

The preferred embodiment of the invention, as represented in FIG. 1, comprises a first cylindrical vessel 1 and a second polishing vessel 2. The vessels of the invention are adapted for a continuous or discontinuous operating mode for treating a fluid stream containing a dispersion including an aqueous-phase and a non-aqueous-phase which contains non-aqueous organic compounds wherein one phase is dispersed in the other. The dispersion may also include solid particles.

The first vessel includes inlet port 82 located at the center of the lower wall of the vessel and inlets ports on each side, 24 and 25. Outlet ports are positioned near the top of the vessel, outlet port 83 in the center with outlet ports 26 and 27 at opposite ends. The vessel is divided in several compartments, with a sequence of liquid compartments followed by oil coalescing compartments. The oil coalescing compartments are each filled with a layer of polymeric coalescing media. In FIG. 1, seven liquid compartments 10, 11, 12, 13, 14, 15 and 16, and six layers or zones of the absorbent 3, 4, 5, 6, 7 and 8 are represented, however the number of compartments can vary depending on the characteristics of the fluid stream to be treated. Each liquid compartment is made by joining two parallel perforated plates 62 by a series of supports 63 which are joined to the perforated plates. Various types of screens partitions and support means can be envisaged to replace plates 62 and supports 63.

The fluid stream to be treated is introduced via a feed pipe 19, to a feed pump 20. The pumped fluid stream, or feed supply, is directed to the inlet port 82 by opening the valve 21, with valve 23 remaining closed. Valve 29 in outlet 83 is maintained closed, with valve 28 connected to the outlet ports 26 and 27 at opposite ends of the vessel left open. The fluid enters a central liquid compartment 13 and is distributed horizontally to both sides of the vessel 1. The fluid stream passes through the layers or zones of absorbent 5 and 6, where the non-aqueous phase of the emulsion coalesces into larger droplets. The differential pressure will be measured and controlled, with the layers slowly becoming saturated, they will coalesce the non-aqueous phase of the emulsion and will release larger droplets. The larger droplets due to their higher rising velocity float to the top of the liquid compartments 12 and 14, while the fluid stream still containing smaller droplets will pass through the downstream polymeric absorbents 4 and 7 where the smaller droplets will be coalesced into larger droplets. As the layers of absorbent 4 and 7 slowly become saturated, they will continue to coalesce the non-aqueous phase of the emulsion and will also release larger droplets. These larger droplets due to their higher rising velocity will float to the top of the liquid compartments 11 and 15, and the fluid stream containing even fewer emulsion droplets will pass through the zones of absorbent 3 and 8 where they too will be coalesced to larger droplets which will float to the top of the liquid compartments 10 and 16. The result is a partially coalesced emulsion which is a mixture of the continuous-aqueous-phase containing non-aqueous phase droplets and the free-floating larger droplets of the non-aqueous-phase and is collected through the outlet ports 26 and 27, and directed to the second cylindrical polishing vessel 2.

With time there a gradual blockage of the absorbent zones, which is indicated by an increase in the differential pressure across the various compartments in vessel 1. If solids are present in the inlet fluid stream dispersion, the increase in the differential pressure may be quite dramatic. This increase may be due to a highly viscous oil layer formation or the clogging by solid particles in the polymeric absorbent layers adjacent to the central liquid compartment 13. The differential pressure is measured between pressure gauges 55 and 54 and/or pressure gauges 55 and 56 which will be monitored through a controller.

When a specified pressure differential across the layers of the absorbent 5 and/or 6 in vessel 1 is reached, the fluid flow into vessel 1 is changed, by opening valves 23 and 29 and by closing valves 21 and 28. This change in the flow direction, causes the fluid stream to be directed through the first vessel via the inlet ports 24 and 25, located at each end-side of the vessel. The flow of fluid into the vessel will be split, and enter from both ends of vessel 1, through the absorbent layers 3, 4 and 5 consecutively, and the absorbent layers 8, 7 and 6 consecutively. In changing the flow direction, absorbent layers 5 and 6 which where the upstream or first treatment zones, become the downstream or final treatment zones, and zones 3 and 8 which were the downstream or last absorbent zones become the upstream or first zones.

It must be noted that although the differential pressure can be used as the means of determining when the flow direction towards the vessel should be changed, in the preferred embodiment this change is based on the time required to reach this blockage. If the primary vessel becomes blocked under normal circumstances after 1 day, the flow direction can be changed every 12 hours so that more consistent operations are maintained.

In a similar way to that previously described, absorbent zones coalesce the non-aqueous phase droplets and the free-floating non-aqueous phase droplets float to the top of the liquid compartments 10, 11, 12, 16, 15 and 14 and the absorbent layers 5, 6 which were clogged with viscous oil or solid particles will be washed out by the flow of the fluid stream in the opposite direction. The resulting mixture of treated aqueous-phase, the free-floating non-aqueous phase and the enlarged solid particles is collected in the central liquid compartment 13 and directed via the outlet port 83 to vessel 2. The outlets from the first vessel are oversized so that the liquid velocity within the outlets 26, 27, 83 towards the polishing vessel 2 is maintained at a low speed, to minimize the re-dispersion of the emulsion back to a highly dispersed form.

Once again the pressure differential will increase. After a certain time period has elapsed or when a given pressure drop across absorbent layers 3 and/or 8 of vessel 1 is reached, the fluid stream direction is reversed again, by opening valves 21 and 28 and by closing valves 23 and 27 and the same process of changing the direction of flow is repeated every time a particular pressure drop across the absorbent layers 5 and/or 6 or 3 and/or 8 is reached. The particular pressure selected is likely to be based on the type of pump 20 used to feed the dispersion to the vessel 1. If a centrifugal pump is used, as the differential pressure across the polymeric absorbent increases, the flowrate of the pump will decrease, and if the flow is not changed while still well within the range of the centrifugal pump, the pump will overheat and may fail. Pumps capable of withstanding reasonable pressure variation are used.

It should be noted, that at steady operations of the apparatus, the time period required before the blockage of the absorbent occurs will be relatively uniform. The reversal of the flow direction through the absorbent zones, will be done automatically on a timed basis, well before the absorbent zones become blocked, with the differential pressure instruments still monitoring the pressure change in case an unexpected blockage occurs, and the flow direction must be changed unexpectedly due to a process upset.

The flow of the partially coalesced emulsion from vessel 1 is directed towards a second polishing vessel 2. The second cylindrical pressure vessel 2 has two ports, 32 and 33, one port on each of its sides. One of the ports will act as the inlet while the other serving as an outlet. The vessel is divided in three compartments: a liquid compartment 17; a polishing polymeric compartment containing layer of the polymeric absorbent 9, the sorbent is the same as that found in vessel 1; and finally another liquid compartment 18. Each liquid compartment is made by joining two parallel perforated plates 62 to supports 63 in a similar manner as in vessel 1.

The outlet flow of partially coalesced emulsion, from the vessel 1, is directed to vessel 2 via the inlet 32 by opening valves 30 and 34 and by closing valves 31 and 35. The free-floating big droplets of the non-aqueous-phase will float to the top of the liquid compartment 17 due to their high rising velocity, pass through the top absorbent layer 9, whereas the solid particles that were enlarged in vessel 1 will settle to the bottom of the liquid compartment 17. If solids are present, they will be collected periodically, from outlets 45 and 51, by actuating valves 44 and 50. The polishing vessel 2 also has baffles 62, 63, 64 and 65 associated with the perforated plates which are designed to trap the settling solids in the polishing vessel 2.

The emulsified non-aqueous-phase liquid still remaining in the aqueous-phase liquid will be coalesced into larger droplets in the absorbent layer 9. Larger droplets of the non-aqueous-phase liquid will float to the top of the liquid compartment 18 and the polished aqueous phase with acceptable levels of the non-aqueous-phase will leave vessel 2 through outlet port 33, and the clean water pipe 36. When a certain thickness of free-floating polished non-aqueous phase oil is formed at the top of the liquid compartment 18, a detector 37 will open an automatic valve 38 and the free-floating oil will be collected and recovered via the oil outlet port 39 and the oil pipe 40.

When a certain time period has gone by or a given pressure drop across the layer of the absorbent 9 of vessel 2 is attained, as measured by the differential of pressure gauges 59 and 60, due once again to highly viscous oil and/or solid particles in the layer of polishing absorbent, the inlet stream will be changed and the direction of flow reversed, by opening valves 35 and 31 and closing valves 30 and 34. By reversing the flow direction, the inlet mixture stream is directed to vessel 2 via the inlet port 33. The mixture stream will pass horizontally from right to left through the polishing polymeric absorbent layer 9. The free-floating big droplets of the non-aqueous-phase will float to the top of the liquid compartment 18 due to their high rising velocity, pass through the top absorbent layer 9. If solids are present, the solid particles which were enlarged in vessel 1 will settle to the bottom of compartment 18 from where the solids will be periodically collected through outlet ports 49 and 47, by opening valves 48 and 46. Nozzle 61 is closed with a plug during operation, but is used to purge air from the polishing vessel during the start-up and stoppage.

The emulsified non-aqueous-phase liquid still remaining in the aqueous-phase liquid will be coalesced into-larger droplets in the absorbent layer 9, which will float to the top of the liquid compartment 17 and the polished water with an acceptable level of the non-aqueous-phase will be collected and recovered through-outlet port 32 and clean water pipe 36. When a certain thickness of free-floating polished non-aqueous phase is formed in the top of the liquid compartment 17, a controlling device 41, will opening of an automatic valve 42 and the free-floating polished non-aqueous phase will be collected and recovered via the oil outlet port 43 and the oil pipe 40.

The same process of reversing the flow through the polishing vessel 2 is repeated at a given time interval or at a given pressure drop across the absorbent layer 9 is reached.

When even by reversing the direction of the mixture stream through the second vessel will not allow to decrease the pressure drop through the single layer of the absorbent, this layer should be replaced. The saturated or clogged absorbent can be regenerated by centrifugation at 1000 g-force at least for 5 to 10 minutes. The centrifuged absorbent can be reused more than 100 times in the process.

Figure 2:
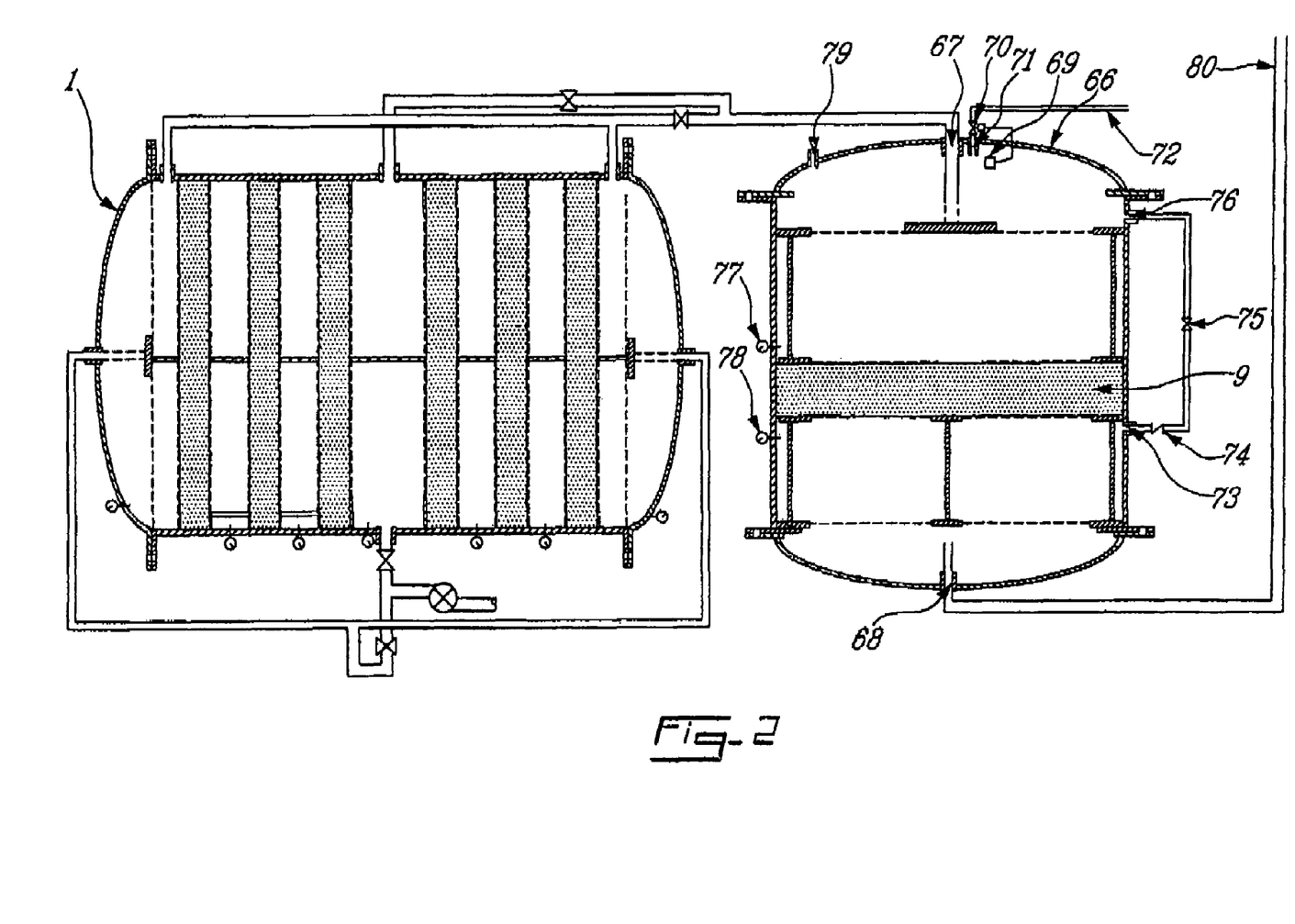
FIG. 2 is a schematic representation of apparatus of the invention with a plurality of vertical absorbent compartments, and a primary vessel having a horizontal aspect and polishing vessels having a vertical aspect and a horizontal absorbent compartment.

Referring to FIG. 2, another preferred embodiment of the invention is represented which too is adapted for a continuous operating mode for treating a fluid stream containing a continuous aqueous-phase with dispersed non-aqueous-phase which contains non-aqueous organic compounds with very few solid particles. The embodiment of the invention comprises a first horizontal cylindrical pressure vessel 1 as described previously and a second vertical cylindrical pressure vessel 66.

The partially coalesced emulsion recovered in the first vessel 1 is directed through the second vessel 66 via the inlet port 67 and be deflected by a baffle. The free-floating big droplets of the non-aqueous-phase will float to the top of the second vessel 66 due to their high rising velocity. The emulsified non-aqueous-phase liquid still remaining in the aqueous-phase liquid will be coalesced into larger droplets in a horizontal polymeric polishing absorbent layer 9, the absorbent here too is the same as that in vessel 1. This layer will eventually release large droplets of the non-aqueous-phase liquid which will be collected via the outlet port 73 to the inlet port 76 and thus, will rise to the top of the second vessel. A check-valve 74 and valve 75 on the pipe interconnecting the two previous ports will ensure that the fluid mixture will not by-pass the absorbent layer. The polished aqueous phase with an acceptable level of the non-aqueous-phase is collected and recovered through the outlet port 68 and the clean water pipe 80. When a certain thickness of free-floating oil is formed in the top of the second vessel 66, a detector 69 will control the opening of an automatic valve 70 and the free-floating polished non-aqueous phase will be collected and recovered via the oil outlet port 71 and the oil pipe 72. Nozzle 79 is normally plugged and can be used to allow air in and out of the polishing vessel during start-up and maintenance operations.

When a given pressure drop across the layer of the absorbent 9 of the second vessel 66, measured by the differential pressure between pressure gauges 77 and 78, is reached due to a blockage by highly viscous oil or unexpected solid particles of the layer of absorbent, the absorbent must be removed from the vessel and replaced by a new or a refurbished (centrifuged) absorbent.

What is claimed is:

1. A method of separating immiscible liquids in a dispersion comprising solids, an aqueous liquid and at least one non-aqueous liquid immiscible in the aqueous liquid and wherein the solids and the non-aqueous liquid are dispersed in the aqueous liquid, comprising:

a) feeding the dispersion from a feed supply to a primary vessel having a plurality of coalescing compartments, in a first direction through the compartments from an initial upstream compartment to a final downstream compartment;

b) partially coalescing the dispersed non-aqueous liquid through all the coalescing compartments;

c) recovering a partially coalesced emulsion of said solids and said non-aqueous liquid, after passage through all the coalescing compartments downstream of said final downstream compartment, and d) periodically discontinuing the feeding in said first direction and feeding said dispersion in a second direction, counter to said first direction, such that said final downstream compartment of a) becomes a second direction initial upstream compartment and said initial upstream compartment of a) becomes a second direction final downstream compartment, wherein the coalescing compartment contains a coalescing media with a substantially homogeneous porous mass, the porous mass including a network of fine filaments and substantially uniform sized open cells in the filaments, wherein the uniform sized open cells have a cell diameter of 160 to 220 μm, and the coalescing media separating the partially coalesced emulsions from the aqueous phase by retaining said solids and said non-aqueous liquid, the emulsion having a droplet diameter of 0.5 μm or more, and, wherein said solids and said non-aqueous liquids are washed out of the coalescing media when the direction of feeding is changed in step d).

2. A method according to claim 1, further comprising:
   e) feeding the partially coalesced emulsion to a polishing vessel, housing at least one polishing coalescing compartment, in a first polishing direction;
   f) partially coalescing the emulsion in the at least one polishing coalescing compartment;
   g) recovering a polished aqueous phase, a polished non-aqueous phase and said solids, and
   h) periodically discontinuing the feeding of the partially coalesced emulsion in said first polishing direction and feeding said emulsion in a second polishing direction, counter to said first polishing direction, such that a final downstream polishing compartment becomes an initial upstream polishing compartment and said initial polishing compartment becomes a final downstream compartment.

3. A method according to claim 2, wherein the polishing vessel includes only one coalescing compartment.

4. A method according to claim 1, wherein the method is discontinuous.

5. A method according to claim 1, wherein the method is continuous.

6. A method according to claim 1, further comprising monitoring a differential pressure of the said initial upstream compartment of a) as a means of measuring a level of blockage in said initial upstream compartment, and performing d) in response to the a predetermined level of blockage in the initial upstream compartment.

7. A method according to claim 1, wherein the plurality of coalescing compartments is at least three.

8. A method according to claim 7, wherein the plurality of coalescing compartments is six, the compartments being disposed in two parallel series of three coalescing compartments.

9. A method according to claim 1, wherein the method is continuous.

10. A method according to claim 9, wherein the porous mass in the non-compressed state has a non-compressed density varying from 1.5 to 2.5 lbs/ft$^3$; a void space from 80% to 98%: and 65 to 120 pores per linear inch.

11. A method according to claim 1, wherein the porous mass has a compressed state.

12. A method according to claim 11, wherein the porous mass in the compressed state has a compressed density varying from 2.5 to 19 lbs/ft$^3$; a void space of from 60% to 80%; and 120 to 900 pores per linear inch.

13. A method according to claim 1, wherein the cells have a cell wall thickness between 40 and 55 μm.

14. A method according to claim 1, wherein the coalescing media is of a polymer selected from the group consisting of polyurethane, polyester, polystyrene, polypropylene and polyethylene.

15. A method according to claim 1, wherein the coalescing media is of polyurethane.

16. An apparatus for separating immiscible liquids in a dispersion comprising solids, an aqueous liquid and at least one non-aqueous liquid immiscible in the aqueous liquid and wherein the solids and the non-aqueous liquid are dispersed in the aqueous liquid, comprising:
   a primary vessel including;
   an inlet means through which the dispersion enters the vessel and producing a flow within the vessel in a first direction;
   an outlet means through which a partially coalesced emulsion leaves the vessel;
   a plurality of coalescing compartments which the dispersed non-aqueous liquid partially coalesces to produce the partially coalesced emulsion; the compartments including a first direction upstream compartment and a first direction last downstream compartment;
   a flow direction changing means acting on the inlet means and the outlet means for periodically changing the flow within the vessel to a second direction counter to the first direction, such that said first direction upstream compartment becomes a second direction last downstream compartment and said first direction last downstream compartment becomes a second direction upstream compartment
   whereby the partially coalesced emulsion leaving the vessel has passed through all the coalescing compartments,
   wherein the coalescing compartments contains a coalescing media with a substantially homogeneous porous mass, the porous mass including a network of fine filaments and substantially uniform sized open cells in the filaments, wherein the uniform sized open cells have a cell diameter between 160 to 220 μm, and the coalescing media separating the partially coalesced emulsions from the aqueous phase by retaining said solids and said non-aqueous liquid, the emulsion having a droplet diameter of 0.5 μm or more, and
   the coalescing media readily releasing said solids and said non-aqueous liquid when the flow direction is changed.

17. An apparatus according to claim 16, further comprising:
   a transferring means, communicating between said primary vessel and a polishing vessel;
   the polishing vessel including;
   a polishing inlet means through which the partially coalesced emulsion enters the polishing vessel in a first polishing direction;
   at least one polishing coalescing compartment in which the partially coalesced liquid further coalesces to produce a polished non-aqueous phase and a polished aqueous phase;
   a polished non-aqueous phase outlet means; and
   a polishing outlet means through which a polished aqueous phase leaves the polishing vessel, and
   a polishing flow direction changing means acting on the polishing inlet means and the polishing outlet means for periodically changing the flow within the polishing vessel to a second polishing direction counter to the first polishing direction,
   wherein the polishing vessel further includes a solids removal outlet means for the removal of said solids in the dispersion.

18. An apparatus according to claim 17, wherein the polishing vessel is cylindrical, disposed horizontally and includes heads.

19. An apparatus according to claim 17, wherein the number of polishing coalescing compartments is one, disposed vertically in the cylindrical vessel to produce a circular cross section in the first polishing direction.

20. An apparatus according to claim 17, wherein the polishing vessel is cylindrical, disposed vertically and includes heads.

21. An apparatus according to claim 17, wherein the number of polishing coalescing compartments is one, disposed horizontally.

22. An apparatus according to claim 17, wherein the transferring means is a pipe connecting the primary vessel and the polishing vessel;
   the polishing vessel is disposed horizontally and comprises
   a cylindrical housing having a top wall, ends and heads mounted on the ends of the housing;
   one polishing coalescing compartment mounted vertically located at the center of the housing
   an polishing inlet and a polishing outlet through which the partially coalesced emulsion and the polished aqueous phase are interchangeable passed;
   the polishing flow in the first polishing direction is established with a first polishing control valve open allowing the emulsion into the polishing vessel through a port on the first head, a second polishing control valve is closed, a third polishing control valve is closed and a fourth polishing control valve is open allowing the polished aqueous phase to leave the polishing vessel;
   the polishing flow in the second polishing direction is established with a first polishing control valve closed, a second polishing control valve is open allowing the emulsion into the polishing vessel through a port on the first head, a third polishing control valve is open allowing the polished aqueous phase to leave the polishing vessel and a fourth polishing control valve is closed; and
   differential pressure controllers measuring differential pressure across each of the polishing coalescing compartment, the differential pressure increasing with time, at a particular pressure and at a particular time interval the controllers actuating the control valves and changing the flow from the first polishing direction to the second polishing direction, after the time interval has passed for a second time, the controllers actuating the control valves and changing the flow from the second polishing direction to the first polishing direction.

23. An apparatus according to claim 16, wherein the apparatus operates in a discontinuous mode.

24. An apparatus according to claim 23, wherein the apparatus operates in a continuous mode.

25. An apparatus according to claim 16, wherein the plurality of coalescing compartments is at least 3.

26. An apparatus according to claim 25, wherein the plurality of coalescing compartments is 6 and the compartments are arranged in two parallel series of three coalescing compartments.

27. An apparatus according to claim 26, wherein the coalescing compartments are disposed vertically.

28. An apparatus according to claim 16, wherein the primary vessel is cylindrical, disposed horizontally and includes heads.

29. An apparatus according to claim 16, wherein the coalescing compartments are disposed vertically in the cylindrical vessel to produce compartments with a circular cross section of the flow in the first direction.

30. An apparatus according to claim 16, wherein
   the primary vessel is disposed horizontally and comprises;
   a cylindrical housing having a top wall, ends, and heads mounted on the ends of the housing;
   a first inlet mounted centrally on the housing and two inlets mounted on the heads;
   three outlets mounted on the top wall, a first outlet centrally mounted between two outlets adjacent to the ends;
   six coalescing compartments mounted vertically and spaced substantially equally throughout the housing, each coalescing compartment and being separated by a liquid compartment,
   the flow in the first direction is established with a first control valve opening to allow the dispersion into the first inlet, a second control valve remaining closed, a third control valve opened to collect the partially coalesced emulsion from the two outlets adjacent to the ends, and a fourth control valve closed;
   the flow in the second direction is established with the first control valve closed, the second control valve opened to allow the dispersion to flow into the each of the two inlets mounted on the heads, the third control valve is closed and the fourth control valve opening to allow the first outlet centrally mounted on the housing to allow the partially coalesced emulsion to leave the primary vessel; and
   differential pressure controllers measuring differential pressure across each of the coalescing compartments, the differential pressure increasing with time, at a particular pressure and at a particular time interval the controllers actuating the control valves and changing the flow from the first direction to the second direction, after the time interval has passed for a second time, the controllers actuating the control valves and changing the flow from the second direction to the first direction.

31. An apparatus according to claim 16, wherein the porous mass has an absorption or adsorbent character effective to trap dispersed non-aqueous droplets for coalescence, and readily release coalesced droplets of the non-aqueous liquid.

32. An apparatus according to claim 16, wherein the porous mass has a non-compressed state.

33. An apparatus according to claim 32, wherein the porous mass in the non-compressed state has a non-compressed density varying from 1.5 to 2.5 lbs/ft$^3$; a void space from 80% to 98%: and 65 to 120 pores per linear inch.

34. An apparatus according to claim 16, wherein the porous mass has a compressed state.

35. An apparatus according to claim 34, wherein the porous mass in the compressed state has a compressed density varying from 2.5 to 19 lbs/ft$^3$; a void space of from 60% to 80%; and 120 to 900 pores per linear inch.

36. An apparatus according to claim 16, wherein the cells have a cell wall thickness between 40 and 55 µm.

37. An apparatus according to claim 16, wherein the coalescing media is of a polymer selected from the group consisting of polyurethane, polyester, polystyrene, polypropylene and polyethylene.

38. An apparatus according to claim 16, wherein the coalescing media is of polyurethane.

* * * * *